(12) United States Patent
Takeda et al.

(10) Patent No.: US 9,684,096 B2
(45) Date of Patent: Jun. 20, 2017

(54) UNIT FOR IMAGE DISPLAY DEVICE HAVING ADHESIVE LAYER, AND IMAGE DISPLAY DEVICE USING THE UNIT

(75) Inventors: Kentaro Takeda, Ibaraki (JP); Tadashi Kojima, Ibaraki (JP); Toshiki Oomine, Ibaraki (JP); Takuya Mori, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/345,041

(22) PCT Filed: Sep. 14, 2012

(86) PCT No.: PCT/JP2012/073705
§ 371 (c)(1),
(2), (4) Date: Mar. 14, 2014

(87) PCT Pub. No.: WO2013/039225
PCT Pub. Date: Mar. 21, 2013

(65) Prior Publication Data
US 2014/0347730 A1 Nov. 27, 2014

(30) Foreign Application Priority Data
Sep. 15, 2011 (JP) ................................. 2011-201268

(51) Int. Cl.
*G02B 1/10* (2015.01)
*G02B 5/30* (2006.01)
(Continued)

(52) U.S. Cl.
CPC ............ *G02B 1/105* (2013.01); *B32B 17/064* (2013.01); *C08F 220/58* (2013.01);
(Continued)

(58) Field of Classification Search
CPC ................ G02B 5/3083; G02B 5/3033; G02F 1/133528
See application file for complete search history.

(56) References Cited

U.S. PATENT DOCUMENTS

2003/0184704 A1* 10/2003 Akiyama .......... G02F 1/133305
349/158
2005/0205998 A1* 9/2005 Yamada et al. ............... 257/751
(Continued)

FOREIGN PATENT DOCUMENTS

JP A-8-209095 8/1996
JP A-2003-207627 7/2003
(Continued)

OTHER PUBLICATIONS

International Search Report issued in International Application No. PCT/JP2012/073705 mailed Nov. 20, 2012.
(Continued)

*Primary Examiner* — Thomas K Pham
*Assistant Examiner* — Mitchell Oestreich
(74) *Attorney, Agent, or Firm* — Oliff PLC

(57) ABSTRACT

This invention provides a unit for an image display device in which an optical film laminate and a panel for an image display device are laminated with an adhesive layer therebetween. The optical film laminate contains a polarizer and a polarizer protection functional layer laminated to only one surface of the polarizer. The adhesive layer is laminated to the surface of the polarizer that is opposite to the surface that contacts the polarizer protection functional layer. The panel for an image display device is laminated to the surface of the adhesive layer that is opposite to the surface that contacts the polarizer. A glass transition temperature of the adhesive layer is in a range of from 50° C. to 90° C.

10 Claims, 1 Drawing Sheet

(51) Int. Cl.
  *B32B 17/06* (2006.01)
  *C09J 133/06* (2006.01)
  *C09J 133/24* (2006.01)
  *C09J 133/26* (2006.01)
  *C09J 163/00* (2006.01)
  *C08F 220/58* (2006.01)

(52) U.S. Cl.
  CPC ......... *C09J 133/066* (2013.01); *C09J 133/24* (2013.01); *C09J 133/26* (2013.01); *C09J 163/00* (2013.01); *G02B 5/305* (2013.01); *G02B 5/3025* (2013.01); *B32B 2457/20* (2013.01); *G02F 2202/28* (2013.01)

(56) References Cited

U.S. PATENT DOCUMENTS

| | | | |
|---|---|---|---|
| 2006/0061697 A1 | 3/2006 | Kawai et al. | |
| 2006/0128925 A1 | 6/2006 | Arai et al. | |
| 2006/0232726 A1* | 10/2006 | Omatsu et al. | 349/96 |
| 2007/0141361 A1* | 6/2007 | Burckhardt et al. | 428/447 |
| 2008/0226931 A1* | 9/2008 | Hara et al. | 428/522 |
| 2009/0162617 A1* | 6/2009 | Moroishi et al. | 428/172 |
| 2009/0185271 A1 | 7/2009 | Yaegashi et al. | |
| 2012/0183769 A1* | 7/2012 | Nasu et al. | 428/352 |
| 2013/0114026 A1 | 5/2013 | Okamoto et al. | |
| 2013/0202867 A1* | 8/2013 | Coggio et al. | 428/216 |

FOREIGN PATENT DOCUMENTS

| | | |
|---|---|---|
| JP | A-2005-70771 | 3/2005 |
| JP | A-2006-58718 | 3/2006 |
| JP | B2-4306269 | 7/2009 |
| JP | A-2009-193047 | 8/2009 |
| JP | A-2010-85802 | 4/2010 |
| JP | A-2010-286737 | 12/2010 |
| JP | A-2010-286764 | 12/2010 |
| JP | A-2011-154267 | 8/2011 |
| WO | WO 2011/136326 A1 | 11/2011 |

OTHER PUBLICATIONS

Written Opinion of the International Searching Authority issued in International Application No. PCT/JP2012/073705 mailed Nov. 20, 2012.

* cited by examiner

UNIT FOR IMAGE DISPLAY DEVICE HAVING ADHESIVE LAYER, AND IMAGE DISPLAY DEVICE USING THE UNIT

TECHNICAL FIELD

This invention relates to an image display device having an adhesive layer, and specifically to (i) a unit of an image display device having high durability in which an optical film laminate and a panel for an image display device are laminated via an adhesive layer in which an energy curing type adhesive composition is cured, and (ii) an image display device that uses the unit.

BACKGROUND TECHNOLOGY

A polarizer that is manufactured by stretching a polyvinyl alcohol resin (hereafter referred to as a "PVA resin") can be easily divided or broken in a stretching direction. Because of this, in general, instead of being used by itself as a unit, a polarizer is used in a form of an optical film laminate, both sides of which have a polarizer protection functional layer formed thereon for protecting the polarizer and improving durability. In general, a transparent protection film, such as triacetylcellulose (TAC), is used for the polarizer protection functional layers. There are cases in which an optical film laminate is used in which the durability is further improved by laminating a layer having an ultraviolet ray absorption function, a hard coating layer, or the like on a protection film. Recently, there are cases in which a phase difference film for optical compensation is used as a polarizer protection functional layer.

In general, a unit for an image display device, which is used for an image display device, bonds such an optical film laminate to a substrate of a panel for an image display device via a layer of agglutinant. An agglutinant that is used when a panel for an image display device and an optical film laminate are bonded together can be defined so as to have the following characteristics.

- It has high viscosity and is a semisolid substance with a low elastic modulus. By adding pressure, it is bonded with a body to be adhered.
- Even after bonding, it can be exfoliated from the body to be adhered.
- The state of the agglutinant does not change in the bonding step.

An agglutinant with such characteristics is one type within a broad range of adhesives. As the agglutinant exists between two bodies to be adhered and pressure is added, adhesive strength is manifested. Thus, it is also called a "pressure-sensitive adhesive." In this specification, "agglutinant" refers to such a "pressure-sensitive adhesive."

Incidentally, as described above, a conventional optical film laminate generally includes a polarizer and a polarizer protection functional layer on both surfaces of the polarizer. However, if the polarizer protection functional layer could be attached to only one surface, an optical film laminate could be made thinner. Using such a polarizer protection functional layer for one surface in the manufacture of an image display device would reduce the number of materials and reduce the cost, due to the optical film laminate being made thinner. Thus, as the size of today's image display devices becomes large and their thickness becomes thinner, this would be extremely advantageous in terms of the environment and the cost.

However, a polarizer that is formed by stretching a hydrophilic PVA resin has high hygroscopicity, and expansion and contraction are easily generated due to the changes in temperature and humidity. Because of this, when such a protection optical film laminate for one surface and a panel for an image display device are bonded by agglutinant, dimensional changes in the optical film laminate are generated due to changes in heat, humidity, and/or rapid temperature changes. Because of this, there is a possibility that there might be a crack in the optical film laminate, or that the optical film laminate and the panel for an image display device may be exfoliated. Thus, in current technology of manufacturing an image display device using agglutinant, it is difficult to implement a protection optical film laminate in which a protection functional layer is laminated only to one surface of a polarizer.

As a technology that suppresses a crack from being generated in a single protection optical film laminate, a technology is proposed in which a coating layer is formed on a surface of a polarizer on which a protection functional layer is not laminated (for example, Japanese Patent 4306269 (Patent Reference 1)). However, because the polarizer is protected by an extremely thin coating layer, compared to the thickness of the protection functional layer, such an optical film laminate can be used for a small image display device for a mobile [device], but when it is used for a large image display device that is recently demanded, necessary durability against cracking cannot be obtained.

A disadvantage in a technology of bonding a panel for an image display device and an optical film laminate with agglutinant is considered to be solvable by bonding a panel for an image display device and an optical film laminate with adhesive instead of agglutinant. For this, a technology is also proposed. An example of such a technology is Japanese Published Patent Application 2010-286764 (Patent Reference 2).

A technology of Patent Reference 2 relates to an optical laminate in which (i) a liquid crystal panel substrate and (ii) a polarization film in which a transparent protection layer is laminated only to one side are laminated via an adhesive layer therebetween, the adhesive layer comprising an active energy ray curing resin composition including an epoxy compound. According to Patent Reference 2, an optical laminate in which a polarization film and a liquid crystal panel are laminated via adhesive is excellent in thinness, lightness, and durability. However, additional testing by the inventors of this invention confirms that in the optical laminate of Patent Reference 2, an end portion of a polarization film is exfoliated from a liquid crystal panel when the size is large. Additionally, in such an optical laminate, in order to cure an epoxy-based adhesive, an acid generating agent is used, which has a function of generating acid by light, heat, or the like. Because of this, there is a problem that the adhesive layer directly contacts a surface of a polarizer on which a transparent protection layer is not arranged and that an optical characteristic of the polarizer deteriorates due to the effects of the acid. Furthermore, in general, an optical laminate using an epoxy-based adhesive needs a heating step of approximately several tens of minutes (post-curing) after light radiation, so productivity is low, which causes a problem.

Additionally, in this specification, adhesive is used so as to be distinguished from the above agglutinant and can be defined as a substance with the following characteristics.

Adhesive is originally a liquid with low viscosity having flowability, makes a contact area large by sufficiently wetting body to be adhered when it is coated onto body to be adhered, and is bonded with the body to be adhered by curing with light irradiation or heat.

By increasing the light irradiation amount or heat amount, the adhesive passes through an adhesion state and is cured.

After bonding, the body to be adhered and the adhesive layer cannot be exfoliated without breaking agglomeration of the body to be adhered and/or the adhesive layer.

An adhesive state irreversibly changes in a bonding step (changes from liquid to solid).

Adhesive with such characteristics is energy curing type adhesive that manifests adhesive strength by curing the adhesive by applying energy such as light or heat to it. Depending on the type of energy to be applied, it is called, for example, "ultraviolet ray curing type adhesive," "heat curing type adhesive," or the like.

PRIOR ART REFERENCES

Patent References

[Patent Reference 1] Japanese Patent 4306269
[Patent Reference 2] Japanese Published Patent Application 2010-286764

SUMMARY OF THE INVENTION

Problems to be Resolved by the Invention

As described above, large, thin, light image display devices, such as are used for home television, are demanded. At the same time, the cost is decreasing. Because of this, an optical film laminate used for such an image display device is demanded such that a polarizer protection functional layer is laminated only to one side. However, in such an optical film laminate, in conventional technologies, it is difficult to improve cracking resistance of the polarizer.

Furthermore, as a screen of an image display device becomes larger, narrowness of a non-display area of the screen is also demanded. Because of this, as the non-display area becomes narrow, even slight exfoliation between the optical film laminate and the panel for an image display device in a peripheral portion of a display area may deteriorate a display characteristic of the image display device.

Furthermore, in an optical film laminate in which a polarizer protection functional layer is laminated only to one side, the action of contraction and expansion of the polarizer due to heat, humidity, or the like is suppressed by the polarizer protection functional layer on one side. Thus, a dimensional change is more significant than that of an optical film laminate in which polarizer protection functional layers are laminated to both sides of the polarizer. Because of this, in an image display device in which narrowness of the non-display area of the screen is demanded, there is a possibility that the optical film laminate will contract to a size equal to or smaller than the display area, and that a portion that cannot display may be generated.

Thus, when a large optical film laminate is used in which a polarizer protection functional layer is laminated only to one side, an object of this invention is to provide a unit for an image display device, and an image display device using the unit, in which the polarizer has high cracking resistance and in which generation of exfoliation at a peripheral portion of the optical film laminate and generation of a non-display area due to contraction of the optical film laminate are suppressed, not only during changes in a regular usage environment, but also during heat shock testing.

Additionally, an object of this invention is to provide a unit for an image display device, and an image display device using the unit, in which generation of exfoliation at a peripheral portion of the optical film laminate can be suppressed not only in terms of durability in heat shock testing, but also in humidity exfoliation testing.

Means of Solving the Problem

The inventors of this invention accomplished this invention based on the knowledge that the above-mentioned problem may be resolved by bonding an optical film laminate and a panel for an image display device, not with an agglutinant, but with an adhesive layer in which a post-curing glass transition temperature is within a specified range.

In a first mode, this invention provides a unit for an image display device in which an optical film laminate and a panel for an image display device are laminated with an adhesive layer therebetween. The optical film laminate contains a polarizer and a polarizer protection functional layer laminated to only one surface of the polarizer. The adhesive layer is laminated to the surface of the polarizer that is opposite to the surface that contacts the polarizer protection functional layer. The panel for an image display device is laminated to the surface of the adhesive layer that is opposite to the surface that contacts the polarizer. A glass transition temperature of the adhesive layer is in a range of from 50° C. to 90° C.

In a second mode, this invention provides a unit for an image display device in which a surface treatment layer is laminated to an optical film laminate, and the optical film laminate and a panel for an image display device are laminated with an adhesive layer therebetween. The optical film laminate includes a polarizer and a polarizer protection functional layer laminated to only one surface of the polarizer. The surface treatment layer is laminated to the other surface of the polarizer, that is, the surface treatment layer is laminated to the surface of the polarizer that is opposite to the surface that contacts the polarizer protection functional layer. The adhesive layer is laminated to the surface of the polarizer that is opposite to the surface that contacts the polarizer protection functional layer. The panel for an image display device is laminated to the surface of the adhesive layer that is opposite to the surface that contacts the polarizer protection functional layer. A glass transition temperature of the adhesive layer is in a range of from 50° C. to 90° C. In this mode, the polarizer protection functional layer is made by a layer comprising a phase difference film.

In an embodiment of this invention, it is preferable that the adhesive layer is a layer that is formed by curing an energy curing type adhesive composition, including an acrylic compound, with application of energy.

In an embodiment of this invention, it is preferable that a rate of dimensional change when an optical film laminate used for a unit for an image display device is heated at a temperature of 80° C. for 240 hours is 0.02% or below.

In an embodiment of this invention, it is preferable that an area of the optical film laminate is 700 cm$^2$ or more.

In an embodiment of this invention, the polarizer protection functional layer may be a layer comprising a triacetylcellulose film, a polyethylene terephthalate film, a polyethylene naphthalate film, a film-like glass, or the like.

When the polarizer protection functional layer is a layer comprising a triacetylcellulose film, it is preferable that an amount of water absorption of the adhesive layer that bonds the optical film laminate and the panel for an image display device, after being maintained for 24 hours in an environment having a temperature of 60° C. and a humidity of 90%, is 0.15 g/g or less and that the Young's modulus of the adhesive layer in an environment having a temperature of 60° C. and a humidity of 90% is $1 \times 10^4$ Pa or less.

In a third mode, this invention provides an image display device comprising the unit for an image display device as set forth in any of claims 1-9.

According to this invention, a light, thin, large image display device can be provided in which durability is improved and deterioration of a display characteristic is suppressed by bonding an optical film laminate and a panel for an image display device via an adhesive layer in which a post-curing glass transition temperature is within a specified range.

EMBODIMENTS TO IMPLEMENT THE INVENTION

The following specifically explains this invention.

[Optical Film Laminate]

Figure 1:
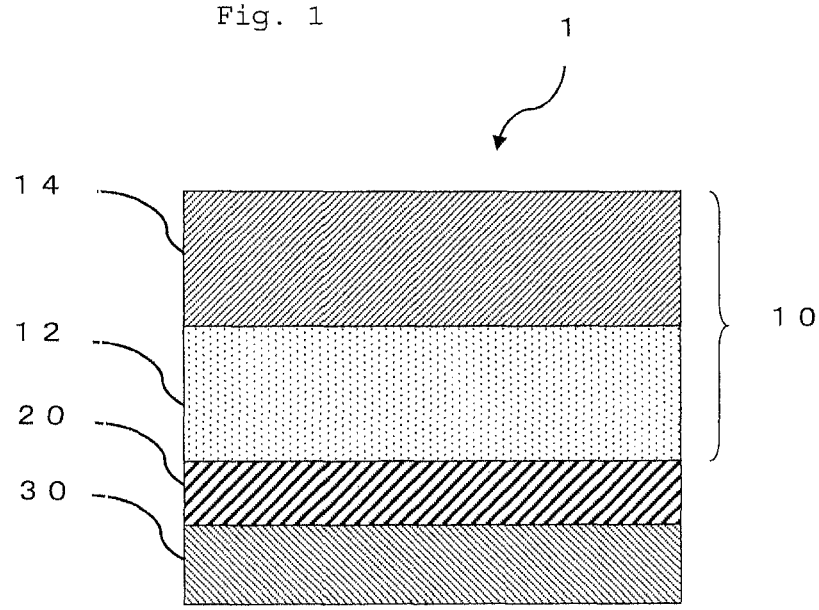
FIG. 1 is a cross-sectional view showing a unit for an image display device according to an embodiment of this invention.

An optical film laminate used for a unit for an image display device, and an image display device, related to this invention has a protection functional layer only on one side. FIG. 1 is a cross-sectional view showing a unit 1 for an image display device, including an optical film laminate 10, related to an embodiment of this invention. In the unit 1 for an image display device, on one surface of a panel 30 for an image display device that can be, for example, a liquid crystal display panel or an organic EL display panel, an optical film laminate 10 is laminated via an optically transparent adhesive layer 20. The optical film laminate 10 includes a polarizer 12 and a polarizer protection functional layer 14. In the optical film laminate 10, the surface of the polarizer 12 that is opposite to the surface that contacts the polarizer protection functional layer 14 is laminated to the panel 30 for an image display device via the adhesive layer 20. The image display device can be formed by further arranging various types of structural members such as the optical film laminate, another optical functional film, a protection film, a backlight unit, or the like in the unit 1 for an image display device as needed.

A polarizer known by those skilled in the art can be used for the polarizer 12. In general, the polarizer 12 is manufactured by performing (i) dye treatment using a dichroic substance and (ii) stretching treatment on a PVA resin. For the manufacturing method, a method known by those skilled in the art may be used. A thickness of the polarizer 12 is usually in a range of from 20 μm to 30 μm.

In general, a film comprising a thermoplastic resin that is excellent in transparency, mechanical strength, heat stability, moisture shielding property, isotropy, and the like is used as the polarizer protection functional layer 14 that protects the polarizer 12. As examples of such a thermoplastic resin, as known by those skilled in the art, a cellulose resin such as triacetylcellulose (TAC), a polyester resin such as polyethylene terephthalate (PET), and polyethylene naphthalate (PEN), a polyethersulfone resin, a polysulfone resin, a polycarbonate resin, a polyamide resin, a polyimide resin, a polyolefin resin, a (meth) acrylic resin, a cyclic polyolefin resin (norbornene resin), a polyarylate resin, a polystyrene resin, a polyvinyl alcohol resin, and mixtures of these can be listed. Additionally, as the polarizer protection functional layer 14, a film-like glass that can be bent in a rolled shape like a plastic film can also be used. If the film-like glass is too thin, it is difficult to handle it. If it is too thick, it is difficult to bend it. Thus, preferably, a film-like glass having a thickness within a range of from approximately 30 μm to approximately 120 μm is used. In general, as the polarizer protection functional layer 14, a transparent TAC film having a thickness within a range of from approximately 40 μm to approximately 80 μm is often used.

As the adhesive that bonds the polarizer 12 and the polarizer protection functional layer 14, materials known by those skilled in the art, which use a polymer, such as an acrylic polymer, a silicone polymer, polyester, polyurethane, or polyamide as a base polymer, can be appropriately selected.

Figure 2:
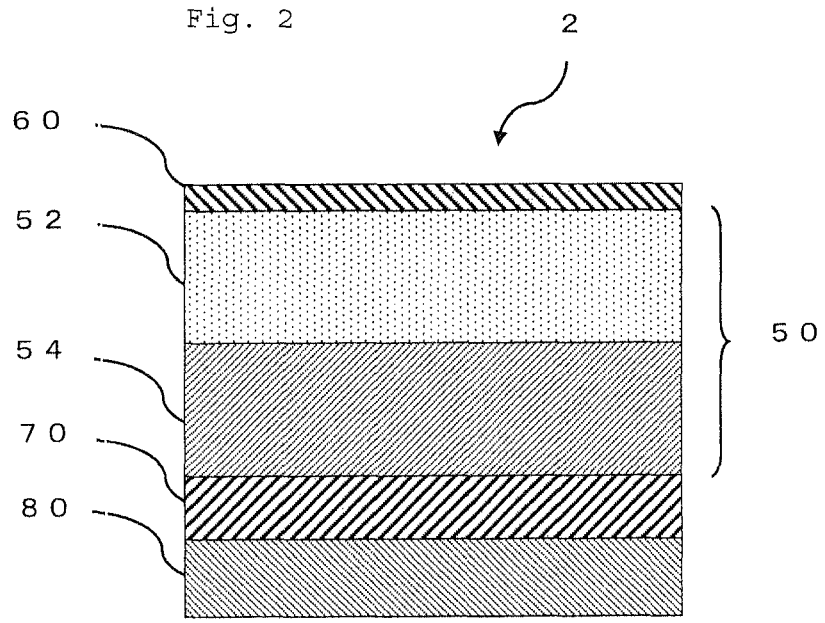
FIG. 2 is a cross-sectional view showing a unit for an image display device according to another embodiment of this invention.

FIG. 2 is a cross-sectional view showing a unit 2 for an image display device, including an optical film laminate 50, related to an embodiment of this invention. In the unit 2 for an image display device, the optical film laminate 50 is laminated to one surface of a panel 80 for an image display device that can be used for, for example, a liquid crystal display panel or an organic EL display panel, via an optically transparent adhesive layer 70. The optical film laminate 50 includes a polarizer 52 and a polarizer protection functional layer 54. In the optical film laminate 50, the surface of the polarizer protection functional layer 54 that is opposite to the surface that contacts the polarizer 52 and the panel 80 for an image display device are laminated via the adhesive layer 70 therebetween. A surface treatment layer 60 that protects the polarizer 52 is laminated to the surface of the polarizer 52 that is opposite to the surface that contacts the polarizer protection functional layer 54. The image display device can be formed by further arranging various types of structural members such as the optical film laminate, another optical functional film, a protection film, a backlight unit, or the like in the unit 2 for an image display device as needed.

In this embodiment, a film comprising a thermoplastic resin that is the same as the polarizer protection functional layer 14 can be used as the polarizer protection functional layer 54. However, a phase difference film, which has an optical compensation function, can also be used as the polarizer protection functional layer 54. Materials used as such a phase difference film are known by those skilled in the art. A film comprising a cycloolefin resin, a TAC resin, or the like can be used.

The unit 2 for an image display device of this embodiment is provided with the surface treatment layer 60 on a viewing window side of the polarizer 52, that is, on the surface of the polarizer 52 that is opposite to the surface that contacts the polarizer protection functional layer 54. The surface treatment layer 60 can be a hard coating layer, an antireflection layer, an antistatic layer, or the like. Technologies for implementing these layers are known by those skilled in the art. A thickness of the surface treatment layer 60 is usually within a range of from 1 μm to 10 μm.

(Rate of Dimensional Change)

In this invention, it is preferable that a rate of dimensional change of the optical film laminate 10 or 50 is within a specified range. In an embodiment, it is preferable that a change rate (this is called a "rate of a dimensional change") between (a) a dimension of the optical film laminate 10 or 50 when it is at 25° C. and (b) a dimension after it is heated at a temperature of 80° C. for 240 hours is less than 0.02%. This characteristic of an optical film laminate 10 or 50 can be accomplished by using the adhesive layer 20 or 70 with a glass transition temperature in a range of from 50° C. to 90° C. If an optical film laminate 10 or 50 is used whose rate of dimensional change is 0.02% or larger, when the unit 1 or 2 for an image display device is subjected to durability testing, the adhesive layer 20 cannot suppress contraction or expansion of the optical film laminate 10 or 50, and cracking is generated in the polarizer 12 or 52. Furthermore, if the dimensional change is large, the optical film laminate 10 or 50 may contract and become smaller than a viewing area particularly when it is used for a large unit for an image display device. In order to avoid this problem, the optical film laminate 10 or 50 may be made large in advance. However, with this countermeasure, a non-display area (so-called frame) of a unit for an image display device needs to be wide, so productivity deteriorates, and there is a negative effect on design characteristics.

[Panel for Image Display Device]

The panel 30 or 80 for an image display device of the unit 1 or 2 for an image display device can be a panel for an image display device such as a liquid crystal display panel, an organic EL display panel, a plasma display panel, or the like. The surface to which the optical film laminate 10 or 50 is laminated via the adhesive layer is a glass or plastic substrate for a panel for an image display device, or a front surface protection plate. These optical film laminates are used so as to demonstrate functions such as image display, antireflection, hue adjustment, or the like in an image display device.

The unit 1 or 2 for an image display device related to this invention is not particularly limited, but it is preferable that a large unit is used, that is, having an area of 700 cm$^2$ or more. In a conventional image display device, an agglutinant is used so as to bond the optical film laminate and a panel for an image display device. As already described, by using an agglutinant, part of the problem in laminating the optical film laminate 10 or 50, of which one side is protected, to a panel for an image display device is solved by the technology of Patent Reference 2. However, in the technology of Patent Reference 2, when the size is large, there is a problem that an end portion of the optical film rises up from a liquid crystal display panel when the unit is subjected to durability testing (also called "heat shock testing"), which is to place the panel for a specified period of time in a high temperature state, then for a specified period of time in a low temperature state, and repeat this a plurality of times. In the unit for an image display device related to this invention, even when the area is 700 cm$^2$ or more, such a problem does not occur.

[Adhesive Layer]

In the unit 1 or 2 for image display device related to this invention, the adhesive layer 20 or 70 that bonds the optical film laminate 10 or 50 and the panel 30 or 80 for an image display device is a layer in which an energy curing type adhesive composition including an acrylic compound is cured by irradiating an energy ray such as a visible ray, an ultraviolet ray, an X ray, an electron beam, or the like, or by heating or the like.

(Glass Transition Temperature)

The adhesive layer 20 or 70 is used in which a glass transition temperature is within a range of from 50° C. to 90° C. By laminating the optical film laminate 10 or 50 and the panel 30 or 80 for an image display device via the adhesive layer 20 or 70 in which the glass transition temperature is within this range, contraction of the polarizer (or the overall optical film laminate) is suppressed by not only the polarizer protection functional layer 14 or 54, but also the thick substrate of the panel 30 or 80 for an image display device in which a modulus of elasticity is much higher than that of the optical film laminate. Therefore, even when the polarizer 12 or 52 is repeatedly expanded or contracted by subjecting the unit 1 or 2 for an image display device that is thus constituted to durability testing (heat shock testing), in addition to regular environmental changes, cracking is not generated in the polarizer 12 or 52. In an embodiment of this invention, heat shock testing used for evaluating durability is a test in which (i) a step in which the unit 1 or 2 for an image display device is maintained for 30 minutes in an environment having a temperature of −40° C. and (ii) a step in which the unit 1 or 2 for an image display device is maintained for 30 minutes in an environment having a temperature of 85° C. are repeated 300 times.

If the glass transition temperature of the adhesive layer 20 or 70 is less than 50° C., when the unit 1 or 2 for an image display device is used for durability testing, the adhesive layer 20 is deformed by contraction and expansion of the polarizer 12 or 52. As a result, contraction and expansion of the polarizer 12 or 52 cannot be suppressed, and cracking is generated in the polarizer 12 or 52.

Meanwhile, if the glass transition temperature of the adhesive layer 20 or 70 is above 90° C., when the unit 1 or 2 for an image display device is subjected to durability testing, a dimensional change in the optical film laminate 10 or 50 is stopped by the adhesive layer 20 or 70. As a result, stress is concentrated at an interface of (i) the adhesive layer 20 or 70 and (ii) the optical film laminate 10 or 50. That stress may become larger than the adhesion strength of the interface, and the adhesive layer 20 or 70 and the optical film laminate 10 or 50 may be exfoliated. This means that, to suppress the exfoliation of the adhesive layer 20 or 70 and the optical film laminate 10 or 50, it is important to consider the balance among (a) the glass transition temperature of the adhesive layer 20 or 70 and (b) the adhesion strength of the interface between the adhesive layer 20 or 70 and the optical film laminate 10 or 50.

(Amount of Water Absorption and Young's Modulus)

Incidentally, if the unit for an image display device shown in FIG. 1 or 2 uses a large optical film laminate, particularly in which the area is 700 cm$^2$ or more, and uses a material with high absorbency and/or moisture permeability as the polarizer protection functional layer, when it is subjected to durability testing (heat shock testing), the problem of exfoliation between the panel for an image display device and the optical film laminate may become more significant than in the case in which the unit is exposed to environment changes in a regular usage environment. In durability testing, in a step of decreasing the temperature from high (85° C.) to low (−40° C.), condensation is usually generated on the surface of the optical film laminate. When the temperature decreases in a state in which condensation is generated, condensed water is coagulated, and then when the temperature increases, the water evaporates. The polarizer itself is constituted by a material sensitive to humidity, and the polarizer protection functional layer also has high absorbency and/or moisture permeability in the case of a film comprising, for example, a TAC resin. Thus, in durability testing of a unit for an image display device using a large optical film laminate, particularly in which the area is 700 cm$^2$ or more, it is subjected to a humid environment. Therefore, a dimensional change of the optical film laminate becomes larger than in a regular usage environment. As a result, exfoliation might be generated.

The inventors of this invention discovered two important things: (1) it is important for the adhesive layer to not easily absorb water so as to effectively suppress such exfoliation in a humid environment, and (2) stress is eased as the adhesive layer itself becomes deformed to some degree.

In this invention, it is preferable that the water absorption amount of the adhesive layer 20 or 70 is in a specified range. In an embodiment, it is preferable that the water absorption amount is 0.15 g/g or less after the adhesive layer 20 or 70 is maintained for 24 hours in an environment having a temperature of 60° C. and a humidity of 90%. If an adhesive layer 20 or 70 is used in which the amount of water absorption is greater than 0.15 g/g after the adhesive layer 20 or 70 is maintained for 24 hours in an environment having a temperature of 60° C. and a humidity of 90%, even if the glass transition temperature is in a range of from 50° C. to 60° C., when the unit 1 or 2 for an image display device is maintained for 500 hours in an environment having a temperature of 60° C. and a humidity of 90%, exfoliation may be generated at an end portion of the optical film laminate.

In this invention, it is preferable that the Young's modulus of the adhesive layer 20 or 70 is in a specified range. In an embodiment, it is preferable that the Young's modulus of the adhesive layer 20 or 70 in an environment having a temperature of 60° C. and a humidity of 90% is $1\times10^4$ Pa or less. If an adhesive layer 20 or 70 having a Young's modulus of greater than $1\times10^4$ Pa in an environment having a temperature of 60° C. and a humidity of 90% is used, even if the glass transition temperature is in a range of from 50° C. to 90° C., when the unit 1 or 2 for an image display device is maintained for 500 hours in an environment having a temperature of 60° C. and a humidity of 90%, exfoliation may be generated at an end portion of the optical film laminate.

(Adhesive Composition)

Thus, the adhesive layer 20 or 70 used for the unit 1 or 2 for an image display device related to this invention has a glass transition temperature in a specified range. Additionally, if a material with high absorbency and/or moisture permeability is used as a polarizer protection functional layer, the adhesive layer 20 or 70 has a water absorption rate and Young's modulus in a specified range. The following explains an adhesive composition so as to obtain such an adhesive layer 20 or 70. In this invention, the adhesive layer 20 or 70 can be obtained by curing an energy curing type adhesive composition including an acrylic compound through irradiating an energy ray, such as a visible ray, an ultraviolet ray, an X ray, an electron beam, or the like, or by heating or the like.

<Acrylic Compound>

A polymeric (meta) acrylic monomer can be used as an acrylic compound included in an adhesive composition. In order to impart adhesiveness with respect to a polarizer, and adhesiveness with respect to a glass or plastic substrate, or an overall protection plate glass, of a panel for an image display device, it is preferable that a polymeric (meta) acrylic monomer includes at least one of a hydroxyl group, a carboxyl group, a cyano group, an amino group, an amide group, a heterocyclic group, a lactone ring group, and an isocyanate ring group. As for a polymeric (meta) acrylic monomer, it is preferable that a monomer containing a monofunctional monomer acryloyl group including only one acryloyl group is a main component. A monomer, including a polyfunctional vinyl or acryloyl group, may be included as a sub-component. For an adhesive composition for this invention, from among these monomers, a monomer is used in which an adhesive layer has a specified range of glass transition temperature when it is cured and becomes an adhesive layer, or two or more types of the above-mentioned monomers may be mixed such that an adhesive layer has a specified range of a glass transition temperature when it is cured and becomes an adhesive layer.

When an adhesive composition is made by mixing two or more types of monomers and has a glass transition temperature in the specified range, for a reference of a glass transition temperature of the composition to be made, it is convenient to use the following equation (reference: T. G. Fox; Bull. Am. Phys. Soc., 1, (3), 123 (1956)).

$$1/Tg = W1/Tg1 + W2/Tg2 + \ldots + Wn/Tgn$$

Tg is the glass transition temperature of an adhesive composition made by mixing two or more types of monomers.

Tg1, Tg2, . . . , Tgn are the glass transition temperatures of a mixed compositions 1, 2, . . . , n.

W1, W2, . . . , Wn are the weight ratios of the mixed compositions 1, 2, . . . , n.

For example, the following substances can be listed as specific examples of an acrylic compound included in an adhesive composition. As acrylic compounds having a hydroxyl group, for example, 2-hydroxyethyl acrylate, 2-hydroxypropyl acrylate, 4-hydroxybutyl acrylate, 2-hydroxyethyl methacrylate, 2-hydroxypropyl methacrylate, or the like are listed. As acrylic compounds having a carboxyl group, for example, acrylic acid, methacrylic acid, or the like are listed. As acrylic compounds having a cyano group, for example, acrylonitrile, methacrylonitrile, or the like are listed. As acrylic compounds having an amino group, for example, dimethylaminoethyl acrylate, dimethylamino propyl acrylate, dimethylaminoethyl methacrylate, diethylaminoethyl methacrylate, diisopropylaminoethyl acrylate, dimethylaminoethyl acrylate, diethylaminoethyl acrylate (DEAA), or the like are listed. As acrylic compounds having an amide group, for example, acrylamide, dimethyl acrylamide, dimethylaminopropylacryl amide, isopropyl acrylamide, diethylacrylamide, hydroxydiethylacrylamide, acryloyl morpholine, or the like are listed. As acrylic compounds having a heterocyclic group, for example, tetrahydrofurfuryl acrylate, tetrahydrofurfuryl methacrylate, glycidyl acrylate, glycidyl methacrylate, pentamethyl piperidinyl methacrylate, tetramethyl piperidinyl methacrylate, or the like are listed. As acrylic compounds having a lactone ring group, for example, γ-butyrolactone acrylate monomer, γ-butyrolactone methacrylate monomer, or the like are listed. As acrylic compounds having an isocyanate ring group, for example, 2-isocyanatoethyl acrylate monomer, 2-isocyanatoethyl methacrylate monomer, or the like are listed.

<Polymerization Initiator>

A known polymerization initiator can be used for a polymerization initiator of an adhesive composition related to this invention. A polymerization initiator is a substance that can absorb energy and generate active species. A polymerization reaction of a monomer begins as active species generated by a polymerization initiator are added to an unsaturated bond of the monomer, and proceeds as the active species of the monomer are added to an unsaturated bond of an adhesive. In this invention, it is preferable that a photopolymerization initiator is used as a polymerization initiator. By using a photopolymerization initiator, a polymerization reaction is generated by light. Thus, control of the adhesion strength and the state of an adhesive composition used for this invention becomes easy, and an optical film laminate that is bonded with a panel for an image display device does not deteriorate and is not destroyed. As photopolymerization initiators, for example, an alkyl-fenon-based photopolymerization initiator, an acylphosphine oxide-based photopolymerization initiator, a titanocene photopolymerization initiator, and a cationic photopolymerization initiator can be listed. As photopolymerization initiators using an ultraviolet ray, for example, various photopolymerization initiators such as a benzoindole-based photopolymerization initiator, a benzophenone-based photopolymerization initiator, an anthraquinone-based photopolymerization initiator, a xanthone-based photopolymerization initiator, a thioxanthone-based photopolymerization initiator, and a ketal-based photopolymerization initiator can be listed.

As specific examples of a photopolymerization initiator, acetophenone-based compounds such as 4-(2-hydroxyethoxy)phenyl(2-hydroxy-2-propyl) ketone, α-hydroxy-α, α'-dimethyl acetophenone, methoxy acetophenone, 2,2-dimethoxy-2-phenyl acetophenone, 2,2-diethoxy acetophenone, 1-hydroxycyclohexyl phenyl ketone, and 2-methyl-1-[4-(methylthio)-phenyl]-2-morpholinopropan-1-one;
benzoin ether compounds such as benzoin ethyl ether, benzoin isopropyl ether, and anisoin methyl ether; α-ketol compounds such as 2-methyl-2-hydroxypropiophenone; ketal compounds such as benzyl dimethyl ketal; aromatic sulfonyl chloride compounds such as 2-naphthalenesulfonyl chloride; photoactive oxime compounds such as 1-phenone-1, and 1-propanedione-2-(O-ethoxycarbonyl) oxime; and benzophenone compounds such as benzophenone, benzoylbenzoic acid, 3,3'-dimethyl-4-methoxy-benzophenone, and 3,3',4,4'-tetra (t-butyl peroxylcarbonyl)benzophenone can be listed.

Energy necessary for a polymerization initiator to generate active species is usually given via one of an optical film laminate and a panel for an image display device to be bonded. Thus, when a photopolymerization initiator is used as a component of an adhesive composition, it is preferable that a photopolymerization initiator that can be used absorbs a wavelength of light that is transmitted through an optical film laminate and a panel for an image display device to be bonded. For example, when (i) an optical film laminate in which a TAC film is used as a polarizer protection functional layer and (ii) a panel for an image display device are bonded, it is preferable that a photopolymerization initiator is used which has absorption of wavelengths longer than 380 nm, which is the wavelength of light that is transmitted through an optical film laminate, such that irradiated light is not absorbed by a light absorbing agent included in the TAC film.

In this invention, as an energy source applied to the adhesive composition, it is preferable that an ultraviolet ray or an electromagnetic wave of a wavelength in the vicinity of an ultraviolet ray is used. If a visible ray is used, a polymerization reaction may proceed due to the effect of surrounding light. There are problems such that control of the reaction may become difficult and that the adhesive composition may be colored because absorption of the visible ray remains due to the remainder of the polymerization initiator. If an infrared ray is used, there are problems such that a polymerization reaction may proceed due to heat, and that control of the reaction may become difficult.

In this invention, it is preferable that after a photoinitiator reacts due to light, there is no absorption in the visible light area, or a degree of absorption in the visible light area is low. In particular, for example, in a liquid crystal display device, it is preferable that in the photoinitiator, there is no absorption, or low absorption, of light of wavelengths in the vicinity of 440 nm, 530 nm, and 610 nm, which are bright line peaks of backlight, so as to not affect hue when visually recognized.

<Mixing Ratio of Acrylic Compound and Polymerization Initiator>

The mixing ratio of the acrylic compound and the polymerization initiator of an adhesive composition is not particularly limited. However, when the ratio of the polymerization initiator is excessive, problems may occur such that the polymerization reaction proceeds too fast, so control of the reaction becomes difficult, the adhesive composition becomes colored, and dispersion of the polymerization initiator becomes poor. When the ratio of the polymerization initiator is too low, the polymerization reaction takes time, and productivity of a process of bonding with the adhesive composition deteriorates, which is not desirable. For example, if hydroxyethylacrylamide (HEAA) is used as the acrylic compound, and acyl phosphonic oxide-based photoinitiator is used as the polymerization initiator, it is preferable that the adhesive composition contains from 0.3 to 3 parts by weight of the polymerization initiator for 100 parts of the HEAA in the adhesive composition.

<Other Additives that can be Added>

In addition to an acrylic compound and a polymerization initiator, as shown below, an additive can also be added to an adhesive composition. For example, in order to improve adhesion of a substrate for a panel for an image display device and an optical film laminate, various Si coupling agents or crosslinking agents can be added to the adhesive composition. Additionally, a polymerization inhibitor can be added to the adhesive composition in order to suppress a dark reaction and increase the usable time of the adhesive composition. Furthermore, by adding to the adhesive composition a photosensitizer that conforms to a transmission wavelength of the optical film laminate, even when a polymerization initiator of a light absorption wavelength that is different from the transmission wavelength of the optical film laminate is used, effects of this invention can be accomplished. Additionally, a conductive material that imparts conductivity, fine particles having birefringence that impart a phase difference, and/or a surfactant that improves surface leveling can be added to the adhesive composition. Furthermore, various curing agents can also be added to the adhesive composition. As a curing agent, a phenol resin, various imidazole-based compounds and their derivatives, a hydrazide compound, dicyandiamide, an isocyanate compound, items that micro-capsulate these, or the like can be listed. For example, if a phenol resin is added as a curing agent, a phosphoric acid-based compound such as triphenylphosphine can be further used together with it as a curing accelerator.

(Thickness of Adhesive Layer)

A thickness of the adhesive layer 20 or 70 is preferably 20 μm or less and more preferably 10 μm or less. If the thickness of the adhesive layer is more than 20 μm, as a contractive force due to curing of the adhesive layer becomes large, particularly in the case of a large unit for an image display device, a curving force is applied to the panel, so there is a possibility of a display failure.

[Method of Manufacturing an Image Display Device]

A method of manufacturing a unit for an image display device related to this invention can include the following steps. First, the polarizer 12 or 52, comprising a PVA resin, and the polarizer protection functional layer 14 or 54 are laminated, and the optical film laminate 10 or 50 on which the polarization protection functional layer is laminated only to one surface of the polarizer is prepared. On the optical film laminate 10 or 50, it is preferable that a temporary protection film is laminated to the surface that is opposite to the polarizer protection functional layer.

Next, in the case of the unit 1 of FIG. 1, on the surface of the polarizer 12 that is opposite to the surface to which the polarizer protection functional layer 14 is laminated, a layer of an adhesive composition including an acrylic composition is formed. Alternatively, after a layer of an adhesive composition including an acrylic composition is formed on a release liner and is dried, the layer of the adhesive composition can be transferred to the surface of the polarizer 12 that is opposite to the surface to which the polarizer protection functional layer 14 is laminated. In the case of the unit 2 of FIG. 2, a layer of an adhesive composition including an acrylic composition is formed on the surface of the polarizer protection functional layer 54 that is opposite to the surface on which the polarizer 52 is formed. Alternatively, after a layer of an adhesive composition including an acrylic composition is formed on a release liner and is dried, the layer of the adhesive composition can be transferred to the surface of the polarizer 12 that is opposite to the surface to which the polarizer protection functional layer 14 is laminated. Any methods of forming and drying the layer of the adhesive composition known by those skilled in the art can be appropriately used. Additionally, any release liner known by those skilled in the art, on which exfoliation treatment is performed to a base film, for example, polyethylene terephthalate, triacetylcellulose, or the like, can be appropriately used.

In the case of the unit 2 of FIG. 2, the surface treatment layer 60 can be formed by exfoliating a temporary protection film on the surface that is opposite to the polarizer protection functional layer, coating and drying a layer including an acrylic compound on the surface of the polarizer 52, and irradiating an energy ray onto the layer and curing it. If a temporary protection film is not laminated, the surface treatment layer 60 can be formed by coating and drying the layer including an acrylic compound on the surface of the polarizer 52 and irradiating an energy ray onto the layer and curing it. According to another method, the surface treatment layer 60 can be formed by coating and drying the layer including an acrylic compound on a film that can be exfoliated, bonding this layer on the surface of the polarizer 52, irradiating an energy ray, curing the layer including the acrylic compound, and eventually exfoliating the film that can be exfoliated. This film that can be exfoliated does not need to be exfoliated, but can be used as a surface protection film that suppresses damage during a manufacturing step.

Next, in both the case of FIG. 1 and the case of FIG. 2, a surface of the layer of the adhesive composition that is opposite to the surface to which the optical film laminate is laminated is laminated to the panel 30 or 80 for an image display device. At this point, in the unit 1 of FIG. 1, a laminate is formed in which the panel 30 for an image display device, the layer of the adhesive composition, the polarizer 12, and the polarizer protection functional layer 14 are laminated in this order, and in the unit 2 of FIG. 2, a laminate is formed in which the panel 80 for an image display device, the layer of the adhesive composition, the polarizer protection functional layer 54, the polarizer 52, and the surface treatment layer 60 are laminated in this order.

Furthermore, as a method of forming these laminates, as described above, instead of a method in which the layer of the adhesive composition is formed on the optical film laminate, and then the panel for an image display device is laminated to the layer of the adhesive composition, a method can also be used in which the layer of the adhesive composition is formed on the panel for an image display device, and then the optical film laminate is laminated to the layer of the adhesive composition.

Next, the layer of the adhesive composition is cured by irradiating an energy ray such as a visible ray, an ultraviolet ray, an X ray, an electron beam, or the like onto these laminates, or by heating these laminates, so as to form the adhesive layer 20 or 70. By this step, the layer of the adhesive composition is completely cured, and the optical film laminate 10 or 50 and the panel 30 or 80 for an image display device are completely adhered to each other.

Embodiments
[Formation of Optical Film Laminate]
<Formation of Polarizer>

One surface of a polyvinyl alcohol film (manufactured by KURARAY CO., LTD., VF-PS-N#7500) having a polymerization degree of 2400, a saponification degree of 99.9%, and a thickness of 75 μm was immersed in warm water at a temperature of 30° C. for 60 seconds, was expanded (swelling bath), and caused to expand double. Next, it was immersed in a solution having a density of 3.2% of iodine/potassium iodide (weight ratio=1/7), and while it caused to expand to 3.5 times, the film was dyed (dyeing bath). Next, it was immersed in a solution having 3% of boric acid and 3% of iodine/potassium iodide for 20 seconds and was caused to expand to 3.6 times (crosslinking bath). Then, in a solution having 4% of boric acid and 5% of iodine/potassium iodide at a temperature of 60° C., it was caused to expand to 6.0 times (extending bath), and in a solution having 3% of iodine/potassium iodide, iodine/potassium iodide impregnation treatment was performed. Finally, it was dried in an oven having a temperature of 60° C. for four minutes, and a polarizer was obtained.

<Formation of Optical Film Laminate>

Next, an optical laminate film (that is used for embodiments 1-5 that will be described later) was obtained by bonding a triacetylcellulose (TAC) film (manufactured by FUJIFILM Corporation, TD80UL), which becomes a polarizer protection functional layer, on one surface of the obtained polarizer. Additionally, at this point, a PET film, which is used for a temporary protection film that can be exfoliated, was overlapped with the other surface of the polarizer. As an adhesive that bonds the polarizer and the TAC film, with respect to 100 parts of a polyvinyl alcohol resin having an acetoacetyl group (average polymerization degree: 1200, a saponification degree of 98.5 mol %, acetoacetylization degree: 5 mol %), 20 parts of methylolmelanin was dissolved in pure water in a condition having a temperature of 30° C., and a water solution that has been adjusted to a solid concentration of 3.2% was used. After the polarizer and the TAC film were bonded to each other with this adhesive by a roll machine in a condition having a temperature of 30° C., it was dried at 60° C. for five minutes. The adhesive was only used between the polarizer and the TAC. When the optical film laminate and the panel for an image display device are bonded to each other, the temporary protection PET film is exfoliated. The thickness of the obtained optical film laminate was 22 μm, and the thickness of the TAC film was 80 μm; thus, the overall thickness was 102 μm.

Additionally, in another embodiment, an optical film laminate (which is used for embodiment 6 that will be described later) was obtained by bonding a film-like glass having a thickness of 100 μm, which becomes a polarizer protection functional layer, to one surface of the obtained polarizer. Furthermore, at this point, a PET film, which is used for a temporary protection film that can be exfoliated, was overlapped with the other surface of the polarizer. An adhesive (adhesive composition 2) that is used for the later-mentioned embodiment 2 was used as an adhesive that bonds the polarizer and the film-like glass. After the polarizer and the film-like glass were bonded to each other by this adhesive by a roll machine in a condition having a temperature of 30° C., an ultraviolet ray was irradiated by an ultraviolet ray irradiator (manufactured by EYE GRAPHICS, CO. LTD., UBX 0801-01, output 8 kW (high pressure mercury lamp)) from the film-like glass side, and the adhesive was cured. The irradiating conditions were a wavelength of 365 nm, an irradiation strength of 30 mW/cm$^2$, and an irradiating time of 30 seconds. The adhesive was only used between the polarizer and the film-like glass. When the optical film laminate and the panel for an image display device are bonded to each other, the temporary protection PET film is exfoliated. In the obtained optical film laminate, a thickness of the polarizer was 22 µm, and a thickness of the film-like glass was 100 µm; thus, an overall thickness was 122 µm.

[Adhesive Composition having Acrylic Compound]

For a monomer of an energy curing type adhesive composition including an acrylic compound, a mixed monomer was used, in which the following ingredients were mixed at the ratios (weight ratios) shown in Table 1. Various mixing ratios were determined such that the post-curing glass transition temperature varies respectively.

HEAA: 2-hydroxyethylacrylamide monomer (manufactured by KOHJIN Holdings Co., Ltd.)

4-HBA: 4-hydroxybutyl acrylate (manufactured by OSAKA ORGANIC CHEMICAL INDUSTRY LTD.)

THFA: Acrylic acid tetrahydrofurfuryl monomer (manufactured by Tokyo Chemical Industry Co., Ltd.)

TABLE 1

| | Adhesive Composition | HEAA (Parts by Weight) | 4-HBA (Parts by Weight) | THFA (Parts by Weight) |
|---|---|---|---|---|
| Embodiment 1 | 1 | 80 | 20 | — |
| Embodiment 2 | 2 | 70 | 30 | — |
| Embodiment 3 | 3 | 50 | 50 | — |
| Embodiment 4 | 4 | 50 | — | 50 |
| Embodiment 5 | 5 | 40 | — | 60 |
| Embodiment 6 | 2 | 70 | 30 | — |
| Comparative Example 1 | 6 | 100 | — | — |
| Comparative Example 2 | 7 | 40 | 60 | — |
| Comparative Example 3 | 8 | 30 | 70 | — |
| Comparative Example 4 | 9 | 70 | — | 30 |

0.5 part of photoinitiator (manufactured by BASF, IRGACURE 819) was added to 100 parts of each mixed monomer that was mixed at a ratio of Table 1, and was dissolved by using an ultrasonic wave while heating at 50° C. in order to increase a dissolution rate, and adhesive compositions of embodiments 1-5 and comparative examples 1-4 were prepared. Furthermore, for each adhesive composition, in order to increase adhesion with a glass, 0.5 part of silane coupling agent (manufactured by Shin-Etsu Chemical Co., Ltd., KBM5103) was added to 100 parts of mixed monomer.

[Adhesive Composition Including Epoxy-based Compound]

In order to use as a comparative example, by mixing each component shown below, an adhesive composition including an epoxy-based compound was prepared. This adhesive composition is an adhesive composition 10 (comparative example 5). A glass transition temperature (Tg) of the adhesive composition 10 (comparative example 5) was 95° C. Furthermore, the adhesive composition 10 (comparative example 5) is considered to be the same as the adhesive composition of the manufacturing example 3 of Patent Reference 2 (Japanese Published Patent Application 2010-286764).

75 parts of 3,4-epoxycyclohexylmethyl 3,4-epoxycyclohexanecarboxylate (manufactured by Daicel Corporation, CELLOXIDE 2021P)

25 parts of bis (3-ethyl-3-oxetanylmethyl) ether (manufactured by TOAGOSEI CO., LTD., ARONE OXETANE OXT-221)

5 parts of photocationic polymerization initiator of 4,4'-bis [diphenylsulfonio] diphenylsulfide bishexafluorophosphate (manufactured by Daicel Cytec, UVACURE 1590)

0.2 part of silicone leveling agent (manufactured by Dow Corning Toray Co., Ltd., SH710)

[Agglutinant]

In order to use as a comparative example, an acrylic agglutinant was prepared. A glass transition temperature (Tg) of this agglutinant was −30° C. The acrylic agglutinant was prepared as follows. First, after 95 parts by weight of butyl acrylate, 3.0 parts by weight of acrylic acid, 0.10 part by weight of 2-hydroxyethyl acrylate, 0.050 part by weight of 2,2-azobisisobutyronitrile, and 200 parts by weight of ethyl acetate were added to a flask having a nitrogen tube and a cooling tube and were sufficiently nitrogen-substituted, a polymerization reaction was performed at 55° C. for 20 hours while stirring in a nitrogen stream, and a solution of an acrylic polymer A of high molecular weight, whose weight average molecular amount was 1,570,000, was obtained. Next, with respect to 100 parts by weight of the above-mentioned acrylic polymer A solution (solid), 0.15 part by weight of dibenzoyl peroxide (one minute half-life: 130.0° C.), 0.080 part by weight of 3-glycidoxypropyltrimethoxysilane as a silane coupling agent, and 0.60 part by weight of an isocyanate-based crosslinking agent (CORONATE L, manufactured by Nippon Polyurethane Industry Co., Ltd.) comprising a tolylene diisocyanate additive of trimethylolpropane as a crosslinking agent were uniformly mixed, and an agglutinant composition (comparative example 6) was prepared. The agglutinant composition was coated on a polyethylene terephthalate film (manufactured by Mitsubishi Polyester, MRF 38), having a thickness of 38 µm, on which silicone exfoliation treatment had been performed, and was dried at 150° C. for two minutes, and peroxide decomposition treatment was performed.

[Bonding Optical Film Laminate and Glass]

Bonding by Adhesive Compositions 1-9

An optical film laminate (which is used in embodiments 1-5 and comparative examples 1-4) that uses a TAC film as a polarizer protection functional layer was cut into nine sheets, each having a size of 32 cm×24 cm. An optical film laminate (which is used in embodiment 6) that uses a film-like glass as a polarizer protection functional layer was cut into one sheet of the same size. Adhesive compositions 1-9 (embodiments 1-6 and comparative examples 1-4) were dropped onto 10 glass sheets by a syringe, a temporary protection PET film was exfoliated from each optical film laminate, and a surface of the optical film laminate from which the PET film was exfoliated and each glass were bonded between rolls, using a laminator. A gap between the rolls was adjusted such that a thickness of a cured layer of the adhesive composition was 10 µm. With respect to this laminate, an ultraviolet ray was irradiated by an ultraviolet ray irradiator (manufactured by EYE GRAPHICS, CO.

LTD., UBX 0801-01, output 8 kW (high pressure mercury lamp)) from the optical film laminate side, and the adhesive composition was cured. The irradiating conditions were a wavelength of 365 nm, an irradiation strength of 30 mW/cm², and an irradiating time of three minutes.

Bonding by Adhesive Composition 10 (Comparative Example 5)

The adhesive compositions for the cases of bonding with the above-mentioned adhesive compositions 1-9 were replaced with the epoxy-based adhesive composition 10 (comparative example 5), and a laminate of an optical film laminate and a glass sheet was formed. With respect to this laminate, an ultraviolet ray was irradiated from the optical film laminate side by a D valve of Fusion UV Systems Japan in an environment having a temperature of 80° C., and the adhesive composition was cured. The amount of irradiation of the ultraviolet ray was 1500 mJ/cm².

Agglutinant

The adhesive compositions for the cases of bonding with the above-mentioned adhesive compositions 1-9 were replaced with agglutinant (comparative example 6), and a laminate of an optical film laminate and a glass sheet was formed. The thickness of the agglutinant layer was 23 μm.

[Measurement of Glass Transition Temperature of Adhesive Layer]

The glass transition temperature Tg of the adhesive layer in which the adhesive compositions 1-10 were cured was measured by the solid viscoelasticity [measurement] device RSA III manufactured by TA Instruments. The measurement samples were created by sandwiching the adhesive compositions 1-10 between PET films on which easy exfoliation treatment had been performed, irradiating an ultraviolet ray by an ultraviolet ray irradiator (manufactured by EYE GRAPHICS, CO. LTD., UBX 0801-01, output 8 kW (high pressure mercury lamp)) in an environment having a temperature of 80° C., curing the adhesive compositions in a film shape, and cutting into a strip shape. Additionally, in order to place the adhesive compositions in a film shape, they were sandwiched between PET films on which easy exfoliation treatment was performed, and UV-irradiated using a high pressure mercury lamp in an environment having a temperature of 80° C. The irradiating conditions were a wavelength of 365 nm, an irradiation strength of 30 mW/cm², and irradiating time of three minutes. The following shows the measurement conditions.

Modification mode: pulling
Frequency: 1 Hz
Initial distortion: 0.1%
Temperature: –40° C. ~200° C.
Temperature raising rate: 10° C./min A storage elastic modulus E' and a loss elastic modulus E" for the created measurement samples were measured, and a peak top of tan δ=E"/E' was defined as the glass transition temperature Tg. Meanwhile, for the agglutinant, in the same manner, tan δ was obtained by a storage elastic modulus G' and a loss elastic modulus G" when torsional stress was applied, and the peak top was defined as the glass transition temperature Tg. Table 2 shows the post-curing glass transition temperatures Tg of the adhesive compositions 1-9 (embodiments 1-6 and comparative examples 1-4) and of the adhesive composition 10 (comparative example 5), and also shows the glass transition temperature Tg of the agglutinant (comparative example 6).

[Durability Testing]

Durability testing was performed for 12 laminates in which an optical film laminate and a glass sheet were laminated via (a) the adhesive layers (embodiments 1-6 and comparative examples 1-5) in which the adhesive compositions 1-10 were cured and (b) an agglutinant (comparative example 6). The generation of cracking in the polarizer and the condition of exfoliation between the optical film laminate and the glass sheet were checked. Durability was checked by heat shock testing. In heat shock testing, a step of maintaining the respective laminates for 30 minutes in an environment having a temperature of 85° C. and a step of maintaining the respective laminates for 30 minutes in an environment having a temperature of –40° C. were considered to be one cycle, and this was repeated 300 cycles. Table 2 shows the results.

TABLE 2

| | Adhesive Composition | Tg (° C.) | Cracking | Exfoliation | Rate of Dimensional Change (%) |
|---|---|---|---|---|---|
| Embodiment 1 | 1 | 83 | ○ | ○ | 0.007 |
| Embodiment 2 | 2 | 75 | ○ | ○ | 0.010 |
| Embodiment 3 | 3 | 51 | ○ | ○ | 0.015 |
| Embodiment 4 | 4 | 78 | ○ | ○ | 0.006 |
| Embodiment 5 | 5 | 66 | ○ | ○ | 0.010 |
| Embodiment 6 | 2 | 75 | ○ | ○ | 0.001 |
| Comparative Example 1 | 6 | 98 | ○ | X | 0.005 |
| Comparative Example 2 | 7 | 38 | X | ○ | 0.024 |
| Comparative Example 3 | 8 | 26 | X | ○ | 0.030 |
| Comparative Example 4 | 9 | 95 | ○ | X | 0.004 |
| Comparative Example 5 | 10 | 95 | ○ | X | 0.004 |
| Comparative Example 6 | (Agglutinant) | –30 | X | ○ | 0.070 |

○: No cracking or exfoliation was generated.
X: Cracking or exfoliation was generated.

As a result of durability testing, there was no cracking or exfoliation in the laminates of embodiments 1-6. These laminates are the ones in which an optical film laminate and a glass sheet were bonded to each other via an adhesive layer having a glass transition temperature Tg within a range of from 50° C. to 90° C. With respect to the laminates of comparative examples 1 and 4, having an adhesive layer whose glass transition temperature is greater than 90° C., exfoliation between the optical film laminate and the glass sheet was confirmed in the peripheral portion, and there was cracking in the exfoliated portion. There was no cracking in the portion that was not exfoliated. With respect to the laminates of comparative examples 2 and 3, having an adhesive layer of which the glass transition temperature is less than 50° C., exfoliation between the optical film laminate and the glass sheet was not confirmed in the peripheral portion, but there was cracking.

With respect to the laminate of comparative example 5, in which the glass transition temperature is 95° C., exfoliation between the optical film laminate and the glass sheet was confirmed in the peripheral portion, and there was cracking in the exfoliated portion. There was no cracking in the portion that was not exfoliated.

Additionally, with respect to the laminates of embodiments 1-6, the rate of dimensional change of the optical film laminate when it is heated at a temperature of 80° C. for 240 hours was checked. All the rates were 0.02% or below.

[Measurement of Amount of Water Absorption]

The measurement samples were created from the respective adhesive compositions 1-9 (embodiments 1-6 and comparative examples 1-4) in the same method as in the case of measuring the glass transition temperature Tg, and the weights of the respective measurement samples were measured. Next, after the respective measurement samples were maintained in an environment having a temperature of 60° C. and a humidity of 90% for 24 hours, the respective weights were measured. The amount of water absorption was obtained by dividing the weights for the respective measurement samples after they were placed in a humid environment by the weights for the respective measurement samples before they were placed in a humid environment.

[Measurement of Young's Modulus]

Film-like measurement samples having a thickness of 0.1 mm were created by curing the adhesive compositions 1-9 (embodiments 1-6 and comparative examples 1-4) in the same method as in the case of measuring the glass transition temperature Tg. These samples were cut to a width of 5 mm and a length of 40 mm and were maintained for 30 minutes in an environment having a temperature of 60° C. and a humidity of 90%. Young's modulus was obtained by pulling these by a tensilon, and dividing stress by a displacement amount when it was stretched by 100%.

[Humid Exfoliation Testing]

Table 3 shows measurement results of the amount of water absorption and Young's modulus, and the results of humid exfoliation testing. For the humid exfoliation of Table 3, a state of each laminate was evaluated after the laminates (embodiments 1-6 and comparative example 1-4) using the adhesive compositions 1-9 were maintained in an environment having a temperature of 60° C. and a humidity of 90% for 500 hours. The evaluation indicators are shown underneath Table 3.

TABLE 3

| | Adhesive Composition | Tg (° C.) | Amount of Water Absorbed (g/g) | Young's Modulus ($\times 10^4$ Pa) | Humid Exfoliation |
|---|---|---|---|---|---|
| Embodiment 1 | 1 | 83 | 0.27 | 1.5 | Δ |
| Embodiment 2 | 2 | 75 | 0.24 | 1.3 | ◯ |
| Embodiment 3 | 3 | 51 | 0.20 | 0.7 | ◯ |
| Embodiment 4 | 4 | 78 | 0.14 | 0.9 | ◉ |
| Embodiment 5 | 5 | 66 | 0.11 | 0.8 | ◉ |
| Embodiment 6 | 2 | 75 | 0.24 | 1.3 | ◯ |
| Comparative Example 1 | 6 | 98 | 0.30 | 1.7 | X |
| Comparative Example 2 | 7 | 38 | 0.18 | 0.6 | ◯ |
| Comparative Example 3 | 8 | 26 | 0.16 | 0.5 | Δ |
| Comparative Example 4 | 9 | 95 | 0.20 | 1.4 | ◯ |

Evaluation indicators for humid exfoliation
◉ Good
◯ There is raising of less than 1 mm at the end portion.
Δ There is raising of less than 3 mm at the end portion.
X There is raising of 3 mm or more, and/or exfoliation is generated.

In the laminates of the optical film laminate and the glass sheet of embodiments 4 and 5 that were created by using adhesive compositions 4 and 5 in which the post-curing Tg is within a range of from 50° C. to 90° C., the amount of water absorbed is 0.15 g or less per 1 g of adhesive, and Young's modulus is $1 \times 10^4$ Pa or less, no exfoliation (humid exfoliation) was generated even when they were maintained in an environment having a temperature of 60° C. and a humidity of 90% for 500 hours. However, in the laminates of embodiments 1-3 that were created using adhesive compositions 1-3 in which the post-curing Tg is within a range of from 50° C. to 90° C. but the amount of water absorption is greater than 0.15 g/g, or the Young's modulus is greater than $1 \times 10^4$ Pa, exfoliation was slightly generated in the peripheral portion when they were maintained in an environment having a temperature of 60° C. and a humidity of 90% for 500 hours (however, in embodiments 2 and 3, it was at a level in which it can also be used for a unit for an image display device that also demanded humid durability testing). It is thought that this is because if Young's modulus of the adhesive layer is high, stress cannot be released with respect to the dimensional change of the optical film laminate in a humid environment, and if the amount of water absorption of the adhesive layer is large, the adhesive layer absorbs water in a humid environment, and adhesion deteriorates. The laminate of embodiment 6 was created using the adhesive composition 2 in which the amount of water absorption is greater than 0.15 g per 1 g of adhesive, and in which Young's modulus is greater than $1 \times 10^4$ Pa, but no exfoliation was generated. This is because the film-like glass is hydrophobic, and there is substantially no dimensional change.

EXPLANATION OF THE SYMBOLS 1, 2 Units for an image display device
10, 50 Optical film laminates
12, 52 Polarizers
14, 54 Polarizer protection functional layers
20, 70 Adhesive layers
30, 80 Panels for an image display device
60 Surface treatment layer

The invention claimed is:

1. A unit for an image display device, comprising:
(i) an optical film laminate including (a) a polarizer and (b) a polarizer protection functional layer that is a layer comprising a triacetylcellulose film and laminated only to one surface of the polarizer, (ii) an energy ray curing-type adhesive layer that is laminated to the other surface of the polarizer, wherein the energy ray curing-type adhesive layer is a layer that is cured and formed by applying an energy ray to an energy ray curing-type adhesive composition including an acrylic compound, and (iii) a panel for an image display device, the panel being laminated to the surface of the energy ray curing-type adhesive layer that is opposite to the surface that contacts the polarizer;
wherein a glass transition temperature of the energy ray curing-type adhesive layer is in a range of from 50° C. to 90° C., wherein Young's modulus of the energy ray curing-type adhesive layer in an environment having a temperature of 60° C. and a humidity of 90% is $1 \times 10^4$ Pa or less.

2. A unit for an image display device, comprising:
(i) an optical film laminate including (a) a polarizer and (b) a polarizer protection functional layer that is a layer comprising a triacetylcellulose film and laminated only to one surface of the polarizer, (ii) a surface treatment layer that is laminated to the other surface of the polarizer, (iii) an energy ray curing-type adhesive layer that is laminated to the surface of the polarizer protection functional layer that is opposite to the surface contacting the polarizer, wherein the energy ray curing-type adhesive layer is a layer that is cured and formed by applying an energy ray to an energy ray curing-type adhesive composition including an acrylic compound, and (iv) a panel for an image display device, the panel being laminated to the surface of the energy ray curing-type adhesive layer that is opposite to the surface that contacts the polarizer protection functional layer;

wherein a glass transition temperature of the energy ray curing-type adhesive layer is in a range of from 50° C. to 90° C., wherein Young's modulus of the energy ray curing-type adhesive layer in an environment having a temperature of 60° C. and a humidity of 90% is $1 \times 10^4$ Pa or less.

3. The unit for an image display device as set forth in claim 2, wherein the polarizer protection functional layer is a layer comprising a phase difference film.

4. The unit for an image display device as set forth in claim 1, wherein a rate of dimensional change of the optical film laminate is 0.02% or below when heated at a temperature of 80° C. for 240 hours.

5. The unit for an image display device as set forth in claim 1, wherein an area of the optical film laminate is 700 cm² or more.

6. The unit for an image display device as set forth in claim 1, wherein an amount of water absorption of the energy ray curing-type adhesive layer after being maintained for 24 hours in the environment having the temperature of 60° C. and the humidity of 90% is 0.15 g/g or less.

7. An image display device comprising the unit for an image display device as set forth in claim 1.

8. The unit for an image display device as set forth in claim 2, wherein a rate of dimensional change of the optical film laminate is 0.02% or below when heated at a temperature of 80° C. for 240 hours.

9. The unit for an image display device as set forth in claim 2, wherein an area of the optical film laminate is 700 cm² or more.

10. An image display device comprising the unit for an image display device as set forth in claim 2.

* * * * *